United States Patent
Afzali-Arkadani et al.

(10) Patent No.: US 6,540,938 B1
(45) Date of Patent: Apr. 1, 2003

(54) LIQUID CRYSTALLINE LIGHT-MODULATING DEVICE

(75) Inventors: Ali Afzali-Arkadani, Yorktown Heights, NY (US); Glenn Allen Held, New York, NY (US); Anthony Cyril Lowe, Braishfield (GB); Robert Dennis Miller, San Jose, CA (US); Uwe Paul Schroeder, Lauffen/Neckar (DE); Robert James Twieg, San Jose, CA (US); Do Yeung Yoon, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/687,875

(22) Filed: Jul. 26, 1996

(51) Int. Cl.[7] ............................................. C09K 19/52
(52) U.S. Cl. ............. 252/299.01; 252/582; 252/299.66; 349/182
(58) Field of Search ....................... 252/299.01, 582

(56) References Cited

U.S. PATENT DOCUMENTS

| | | | |
|---|---|---|---|
| 4,888,126 A | 12/1989 | Mullen et al. | 252/299.5 |
| 5,068,052 A | 11/1991 | Watanabe et al. | 252/299.01 |
| 5,087,387 A | 2/1992 | Mullen et al. | 252/299.5 |
| 5,116,528 A | 5/1992 | Mullen et al. | 252/299.5 |
| 5,188,760 A | 2/1993 | Hikmet et al. | 252/299.01 |
| 5,304,323 A * | 4/1994 | Arai et al. | 252/299.5 |
| 5,315,419 A | 5/1994 | Saupe et al. | 359/46 |
| 5,321,533 A | 6/1994 | Kumar | 359/51 |
| 5,323,251 A * | 6/1994 | Coates et al. | 359/51 |
| 5,354,498 A * | 10/1994 | Akashi et al. | 252/299.01 |
| 5,384,067 A | 1/1995 | Doane et al. | 252/299.01 |
| 5,401,437 A | 3/1995 | Im | 252/299.01 |
| 5,437,811 A * | 8/1995 | Doane et al. | 252/299.01 |
| 5,453,863 A | 9/1995 | West et al. | 359/91 |
| 5,498,450 A * | 3/1996 | Akashi et al. | 428/1 |
| 5,558,813 A * | 9/1996 | Akashi et al. | 252/299.01 |

FOREIGN PATENT DOCUMENTS

| | | | | |
|---|---|---|---|---|
| WO | WO92/19695 | 11/1992 | | C09K/19/56 |
| WO | 93/05436 | * 3/1993 | | |
| WO | WO93/23496 | 11/1993 | | C09K/19/52 |

OTHER PUBLICATIONS

E. B. Priestley, "Liquid Crystal Mesophases", Introduction to Liquid Crystals, RCA Laboratories Princeton, New Jersey, Plenum Press, New York and London.

N. Leroux et al., White Reflective Cholestric Displays, Liquid Crystal Institute and NSF ALCOM Center, Kent State University, Kent Ohio.

E. Armour et al, "Photopolymerization", Encyclopedia of Polymer Science and Engineering, vol. 11, 1988.

D.–K. Yang et al., "Cholesteric Liquid Crystal/Polymer Gel Dispersion Bistable at Zero Field", IEEE, 1991.

D.–K. Yang et al., Cholesteric Liquid Crystal/Polymer Dispersion for Haze–Free Light Shutters, Appl. Phys. Lett., vol. 60, No. 25, Jun. 22, 1992.

J. W. Doane et al., "Front–Lit Flat Panel Display from Polymer Stabilized Cholesteric Textures", Kent State University, Kent, OH., U.S.A., ATI, Farmington Hills, MI., U.S.A.

Y. K. Fung et al., "Projection Display from Polymer Stabilized Cholesteric Textures", Liquid Crystal Institute, Kent State University, Kent, OH, U.S.A., ATI, Farmington Hills, MI., U.S.A.

(List continued on next page.)

Primary Examiner—Cynthia H. Kelly
(74) Attorney, Agent, or Firm—Robert B. Martin

(57) ABSTRACT

The present invention relates to a light-modulating composition comprising a low molecular weight liquid crystalline material dispersed in a polymer including a non-mesogenic crosslinking monomer reacted with a mesogenic monomer comprising a mesogenic group, a spacer, and one or more reactive functionality.

4 Claims, 1 Drawing Sheet

OTHER PUBLICATIONS

L.–C. Chien et al., "Multicolor Reflective Cholesteric Displays and Switchable Color Filters", Liquid Crystal Institute and NSF ALCOM Center, Kent State University, Kent, OH 44242.

D.–K. Yang et al., Cholesteric Liquid–Crystal/Polymer–Gel Dispersions: Reflective Display Applications, SID 92 Digest, pp. 759–761.

P. Swaraj, "Crosslinking: Chemistry of Surface Coatings", Comprehensive Polymer Science, The Synthesis, Characterization, Reactions and Applications of Polymers, vol. 6.

S. P. Pappas, "Photocrosslinking", Comprehensive Polymer Science, The Synthesis, Characterization, Reactions and Applications of Polymers, vol. 6.

S. S. Labana, "Cross–linking, Reversible", Ford Motor Company, Comprehensive Polymer Science, The Synthesis, Characterization, Reactions and Applications of Polymers, vol. 6.

* cited by examiner

LIQUID CRYSTALLINE LIGHT-MODULATING DEVICE

FIELD OF THE INVENTION

The present invention relates to a light-modulating liquid crystalline composition and also to a liquid crystalline display device.

BACKGROUND OF THE INVENTION

Liquid crystals have been used in a wide variety of electro-optic display applications. These include, in particular, electro-optic light-modulating applications which require compact, energy-efficient, voltage-controlled light modulator, such as watch, calculator, and laptop computer displays. Their popularity is due to the conveniently thin, flat shape and the very low power required. In these devices, a thin layer of liquid crystal (usually nematic) is sandwiched between parallel cell walls, which have been treated to control the alignment of the liquid crystal director. When a potential difference is applied to transparent electrodes on either side of the liquid crystal, the resulting electric field causes a realignment of the molecules and a change in the optical behavior of the layer.

The twisted nematic display is commonly used for digital watches and other small displays. The surfaces of the cell are treated so that, in the absence of an electric field, the local liquid crystalline directors are all coplanar, but twist through 90°. Light entering the cell is polarized parallel to the directors at the top surface. The polarization follows the twist in the directors and the light passes through the polarizer at the bottom. The light is then reflected by a mirror and reverses its path to emerge at the top surface. This area appears bright. In an area in which the electric field is turned on, the directors align with the field throughout most of the sample. Now the beam's polarization is not rotated by the liquid crystal directors and the light is absorbed by the second polarizer. This area appears dark.

Cholesteric liquid crystals have been used in reflective displays without a backlight and without a polarizer. Cholesteric liquid crystals generally exhibit three states. In the first, the cholesteric axis is oriented normal to the plane of the display. This is known as the planar or Grandjean state. The planar state will reflect light by the Bragg effect. The reflected wavelength is related to the pitch and the average refractive index of the liquid crystalline material by the relationship $\lambda = n_a * P/2$, where P is the 360 degree pitch length of the cholesteric. Thus, the planar state may appear colored and reflective or, if the pitch is in the infra-red, transparent. The second state is achieved by the application of an electric field sufficient to disrupt the planar state into a disordered, focal conic state. Depending on the nature of the cholesteric material and the cholesteric pitch, the focal conic state may be weakly or strongly light scattering. At higher voltages, the helical pitch is completely unwound and the cholesteric molecules become oriented perpendicular to the plane of the display cell. This is known as the homeotropic state, which is transparent. In pure cholesteric materials, the planar state is stable, the homeotropic state is unstable and the focal conic state is metastable, taking from seconds to hours to revert to the planar state upon removal of an electric field. By stabilizing the appropriate cholesteric state with a polymer network, the focal conic-planar transition time may be greatly reduced. Alternatively, the focal conic state can be stabilized such that it reverts to the planar state only if first switched to the homeotropic state, allowing bistable displays to be made. Examples of these two types of operation are as follows. One type of cholesteric has a first state having a color-reflecting planar configuration. A low-frequency voltage pulse disrupts the alignment of the cholesteric into a light-scattering focal-conic state, which persists after the end of the pulse. A short, higher voltage pulse restores the initial configuration. Another type of cholesteric liquid crystal has a light transparent state and a light scattering focal-conic state. This type of cholesteric is used in the reverse-mode cell display.

Hikmet, U.S. Pat. No. 5,188,760, discloses a polymer stabilized liquid crystal display cell. The cell comprises a low-molecular-weight liquid crystalline material and a polymerizable liquid crystalline material. A polymer is formed from monomers having mesogenic groups positioned between two reactive groups. Unfortunately, the cell requires a higher switching voltage than is desired in certain applications.

It is therefore an object of the present invention to provide an improved liquid crystal display device.

Other objects and advantages will become apparent from the following disclosure.

SUMMARY OF THE INVENTION

The present invention relates to a display device having light-modulating composition comprising a low molecular weight liquid crystalline material dispersed in a polymer including a non-mesogenic crosslinking monomer reacted with a mesogenic monomer comprising a mesogenic group, a spacer, and one or more reactive functionality. Preferably, the reactive functionality is a vinyl group.

In one embodiment of the present invention, the mesogenic monomer has only one reactive functionality and an alkyl spacer is positioned between the mesogenic group and the reactive functionality. The resulting comb polymer is lightly crosslinked. The compositions of the present invention surprisingly exhibit improved light modulating properties including lower driving voltage and/or faster switching speed.

A more thorough disclosure of the present invention is presented in the detailed description which follows and the accompanying drawing.

DETAILED DESCRIPTION OF THE INVENTION

Figure 1:
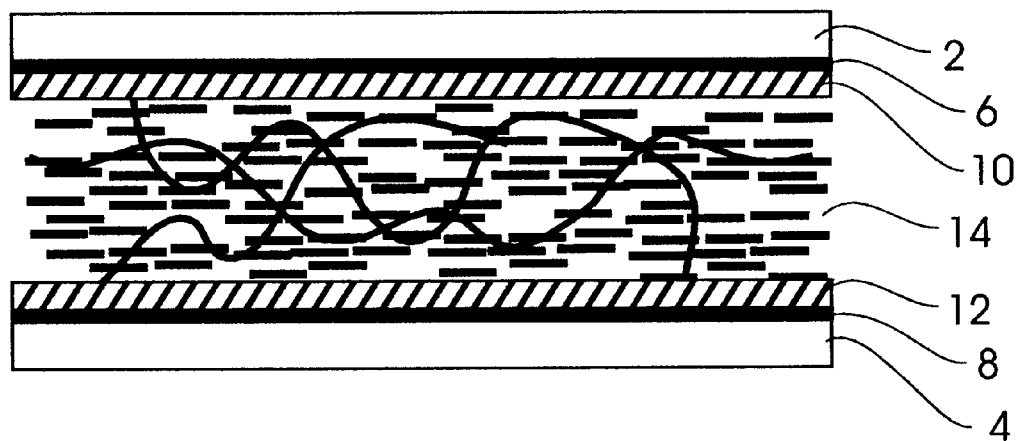
FIG. 1 is a cross-sectional view of an embodiment of the display device of the present invention.

The present invention relates to a display device having light-modulating composition comprising a low-molecular-weight liquid crystalline material dispersed in a unique liquid crystalline polymer network.

The key feature of the composition of the present invention is the liquid crystalline polymer network. The polymer network is formed by reacting a non-mesogenic crosslinking monomer with a liquid crystalline, mesogenic monomer comprising a mesogenic group, an alkyl spacer and one or more reactive functionality. The preferred reactive functionality for the mesogenic monomer is a vinyl substituent (>C=C<), more preferably an activated vinyl group such as an acrylyl substituent (>C=C—CO—). In one embodiment, the mesogenic monomer has only one vinyl reactive functionality and the alkyl spacer is positioned between the mesogenic segment and the reactive functionality. This embodiment provides improved lower switching voltages. In another embodiment, the nonmesogenic crosslinking monomer has three vinyl reactive functionalities to provide improved switching times.

A preferred mesogenic monomer has the structure A—O—$(CH_2)_n$—$(B)_m$—C wherein A is vinyl, acrylyl, or $C_{1-4}$ alkyl acrylyl; B is oxy or carbonyloxy; m is 0 or 1; n is 0 to 20 (preferably 6–12); and C is a mesogenic group. Mesogenic groups as used herein shall mean organic groups which promote formation of liquid crystalline phase. The aromatic character of mesogenic group also stabilize the liquid crystalline phases. Optionally, the mesogenic group may be substituted with halo substituents preferably fluoro. Suitable mesogenic groups are:

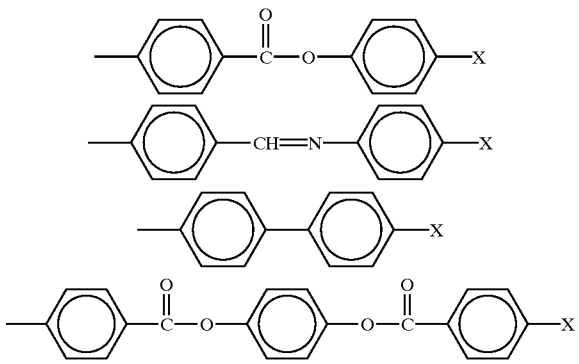

wherein X is hydrido, cyano, or $C_{1-10}$ alkoxy.

Other suitable mesogenic groups will be known to those skilled in the art such as disclosed in Thermotropic Liquid Crystals, Vol. 22 of Critical Reports on Applied Chemistry, G. W. Gray, Editor, John Wiley and Sons (1987); Introduction to Liquid Crystals by Priestley et al. (1975) and M. Schadt, Ber. Bunsenges Phys. Chem., 97, 1213 (1993), the disclosures of which are incorporated herein by reference.

Preferred mesogenic monomers are

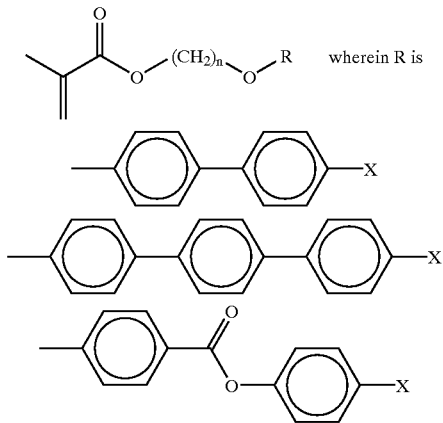

n is 6–11.

and X is cyano or $C_{1-10}$ alkoxy.

Suitable mesogenic monomers are $C_{1-10}$ alkoxyphenoxy benzoyl oxy $C_{1-10}$ alkyl acrylate or methacrylate and cyanobiphenoxy benzoyl oxy $C_{1-10}$ alkyl acrylate or methacrylate.

The nonmesogenic crosslinking monomer functions to crosslink the polymer formed from the mesogenic monomer. The crosslinking monomer does not contain a mesogenic group. The crosslinking monomer generally comprises less than 50 weight % of the network polymer, preferably about 10 to 30 weight %. Suitable crosslinking monomers can be acrylates, methacrylates, acrylamides, epoxys, and vinyl ethers. Preferred crosslinking monomers are trifunctional with three vinyl reactive functionalities or tetrafunctional to provide a highly crosslinked composition for substantially improved switching times. Suitable polyfunctional crosslinking monomers include bisphenol-A-dimethacrylate, 1,6-hexamethylene-dimethacrylate, diethyleneglycol dimethacrylate, 1,1,1-trimethylol-propane-trimethacrylate, glyceryl trimethacrylate and pentaerythritol tetramethacrylate and the corresponding acrylates. Other suitable crosslinking monomers will be known to those skilled in the art such as those disclosed in Encyclopedia of Polymer Science and Engineering Vol. 11, page 186–212 (1988), the disclosure of which is incorporated herein by reference.

Suitable liquid crystalline materials for the composition of the present invention are cholesteric materials, covering the pitch length from the visible to the infrared wavelength region. Depending on the pitch length, they can be switched either from (i) a color-reflecting to a weakly scattering black state or (ii) from a transparent black to a highly scattering white state. Suitable liquid crystalline materials include mixtures of nematic ($C_{1-6}$) alkyl substituted cyanobiphenyl and cyanoterphenyls doped with chiral agents. Chiral agents confer a finite pitch on nematic material. Suitable chiral agents are R1011 and CB15 marketed by Merck Industries. Other suitable liquid crystalline compositions for use in the present invention will be known to those skilled in the art. The pitch length of the liquid crystalline material can be varied by varying the amount of chiral agent in the mixture.

Generally, the liquid crystalline composition of the present invention will comprise about 90 to 98 weight % of the low-molecular-weight (Mn of less than 1000, preferably less than 500) liquid crystalline material, about 0.2 to 3 weight % of the nonmesogenic crosslinking monomer, and about 2 to 10 weight % of the mesogenic monomer.

Referring to FIG. 1, there is shown an embodiment of a liquid crystalline reflective display device (cell) of the present invention comprising glass substrates 2 and 4 each having respectively transparent electrodes 6 and 8, and transparent alignment layers 10 and 12. Light modulating liquid crystalline composition 14 is disposed between alignment layers 10 and 12. The alignment layers, (e.g., polyimide or nylon) facilitate proper alignment of the liquid crystalline composition. A non reflective (black) layer (not shown) is conveniently formed on the back of glass substrate 4. The alignment layers stabilize the cholesteric liquid crystals in the planar orientation, where the director of the cholesteric helix stands perpendicular to the plane of the glass substrates. In this embodiment, the pitch length of the cholesteric liquid crystal is adjusted so that incoming infrared light is reflected. Under field-off conditions the cell is then transparent to visible light and the black background is visible. Upon application of an electric field, the planar texture of the field-off state changes to a highly scattering focal-conic texture. The focal conic texture reflects a portion of the visible light to make the composition appear white. The cell can be readily switched between black and white state by turning the field on and off.

In an alternative embodiment, a projection display may be formed by replacing black layer with a mirror and adding a proper lens system and a light source. A transmission display may also be formed with the light modulating liquid crystalline composition of the present invention.

In another embodiment of this invention, the pitch length of the cholesteric helix is adjusted to reflect incoming visible light with wavelengths between 400 nm and 700 nm. In the field-off state, the cell appears colored. Upon application of an electric field, the planar orientation of the liquid crystal is disrupted and the crystalline material becomes weakly scattering. The weakly scattering material dissipates the light at small forward angles so that the cell appears dark. The cell can be switched from colored to dark state.

The composition of the present invention provides the display device with improved performance in switching voltage and switching times. Although there is a known tradeoff between switching voltage and switching time, the light modulating liquid crystalline composition of the present invention can be designed to provide switching off time (field-free relaxation time) of less than 5 milliseconds preferably less than 2 msec more preferably less than 1 msec or a switching voltage less than 1 volt/micron (thickness of display composition) preferably less than 0.7 V/micron resulting in power savings.

Large area displays of the present invention can be fabricated with an active X-Y matrix addressing system having thin film transistors contiguous to each individual display cell.

The following examples are a detailed description of certain compositions of the present invention. The detailed description falls within the scope of, and serves to exemplify, the more generally described compositions set forth above. The examples are presented for illustrative purposes only, and are not intended as a restriction on the scope of the invention.

EXAMPLE 1

The cell: Glass plates coated with conductive indium-tin-oxide layers (ITO) and buffed alignment layers from polymeric materials. Cell gap provided by 10 micron spacers.

Cholesteric liquid crystal: As a liquid crystal, a combination of the eutectic nematic mixture E48 (Merck) with the chiral dopant R1011 (Merck) was used. E48 contains a mixture of cyanobi- and terphenyls with a broad nematic temperature range. The amount of R1011 was adjusted to 0.5 weight %. This yields a cholesteric liquid crystal with a pitch length of about 5 microns.

Monomers: To the cholesteric liquid crystal mixture was added, mesogenic polymerizable monomers, nonmesogenic crosslinking monomers and a small amount of UV initiator. Liquid crystalline composition:

36.75 mg 4'-oxydecenyl-4-phenylbenzoyl-oxy-hexyloxy-methacrylate (mesogenic, monofunctional chain extender), 12.25 mg Bisphenol-A-dimethacrylate (nonmesogenic, difunctional crosslinker), 1.00 mg Benzoin-methylether (UV initiator), 4.75 mg R1011 (chiral dopant), and 945.25 mg E48 (broad temperature range commercial nematic mixture)

The components were mixed in above order to yield 1000 mg of reactive, cholesteric mixture. The mixture was filled in the display device by means of a vacuum filling technique in order to exclude oxygen inhibition of the polymerization reaction. The polymerization reaction was started by exposing the filled device to UV radiation. The dose was adjusted to 1.5 mW/cm$^2$ at 365 nm. Exposure time was 5.5 hours.

Device operation: Switching voltage 7.9 V (AC). The field-free relaxation time from the scattering, focal-conic texture to the planar texture was 29 msec (measured between 10% and 90% of total specular transmission).

EXAMPLE 2

In this example, the cholesteric liquid crystal and the reactive materials described in Example 1 were used. Liquid crystalline composition/display:

36.75 mg 4'-cyano-4-biphenylyl-oxy-undecyloxy-methacrylate (mesogenic, monofunctional chain extender), 12.25 mg Bisphenol-A-dimethacrylate (nonmesogenic, difunctional crosslinker)

1.00 mg Benzoin-methylether (UV initiator), 4.75 mg R1011 (chiral dopant), and 945.25 mg E48 (broad temperature range commercial nematic mixture)

were mixed in order to yield 1000 mg of reactive, cholesteric mixture. The filling and irradiation procedure were carried out as described in Example 1. Device operation: The driving voltage (90% of total specular contrast) of the device was 7.0 V. The field-free relaxation time from the scattering, focal-conic texture to the planar texture was 92 msec (measured between 10% and 90% of total specular transmission).

EXAMPLE 3

The cell: Glass plates coated with conductive indium-tin-oxide layers (ITO) and buffed alignment layers from polymeric materials. Cell gap of 15 micron provided by spacers. In this example, the cholesteric liquid crystal and the reactive material as described in Example 1 were used. Liquid crystalline composition/display:

36.75 mg 4,4'-biphenylyl-bis[4-oxy-hexyloxy-methacrylate)benzoate] (difunctional chain extender and crosslinker), 12.25 mg 1,1,1-trimethylol-propane-trimethacrylate (nonmesogenic, trifunctional crosslinker)

1.0 mg Benzoin-methylether (UV initiator), 4.75 mg R1011 (chiral dopant), and 945.25 mg E48 (broad temperature range commercial nematic mixture)

were mixed in order to yield 1000 mg of reactive, cholesteric mixture. The filling and irradiation procedure were carried out as described in Example 1. Device operation: The driving voltage (90% of total specular contrast) of the device was 50 V. The field-free relaxation time from the scattering, focal-conic texture to the planar texture was 1 msec (measured between 10% and 90% of total specular transmission).

EXAMPLE 4

In this example, the cholesteric liquid crystal and the reactive material described in Example 1 were used. Liquid crystalline composition/display:

36.75 mg RM206 (Merck) mesogenic, difunctional chain extender and crosslinker)

12.25 mg Bisphenol-A-dimethacrylate (nonmesogenic, difunctional crosslinker)

1.0 mg Benzoin-methylether (UV initiator), 4.75 mg R1011 (chiral dopant), and 945.25 mg E48 (broad temperature range commercial nematic mixture)

were mixed in order to yield 1000 mg of reactive, cholesteric mixture. The filling and irradiation procedure were carried out as described in Example 1. Device operation: The driving voltage (90% of total specular contrast) of the device was 11 V. The field-free relaxation time from the scattering, focal-conic texture to the planar texture was 15 msec (measured between 10% and 90% of total specular transmission).

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. A light modulating display comprising a first and second electrode each having alignment layers and a light modulating composition disposed between the alignment layers, the composition comprising about 90 to 98% of a cholesteric liquid crystalline material having a molecular weight less than about 1000 dispersed in about 2 to 10% weight of a polymer formed by reacting a nonmesogenic crosslinking monomer with a mesogenic monomer comprising a mesogenic group, a spacer and reactive functionality, the alignment layers aligning the liquid crystalline material in a planar orientation, wherein the crosslinking monomer has three vinyl crosslinking groups.

2. The display of claim 1 wherein the crosslinking monomer is trimethylol propane trimethacrylate or triacrylate, or glyceryl triacrylate or trimethacrylate.

3. The display of claim 2 wherein the liquid crystalline material is selected from cyanbiphenyl, cyanoterphenyl, phenylbenzoate, cyclohexylphenyl or mixtures thereof.

4. The display of claim 1 wherein the display has a switching off time of less than 5 miliseconds.

* * * * *